(12) United States Patent
Choi et al.

(10) Patent No.: US 11,532,852 B2
(45) Date of Patent: Dec. 20, 2022

(54) COMPOSITE MEMBRANE, AND LITHIUM BATTERY INCLUDING THE COMPOSITE MEMBRANE

(71) Applicant: Samsung Electronics Co., Ltd., Suwon-si (KR)

(72) Inventors: Kyounghwan Choi, Suwon-si (KR); Wonsung Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 265 days.

(21) Appl. No.: 16/743,489

(22) Filed: Jan. 15, 2020

(65) Prior Publication Data
US 2020/0243825 A1 Jul. 30, 2020

(30) Foreign Application Priority Data
Jan. 24, 2019 (KR) .......................... 10-2019-0009234

(51) Int. Cl.
*H01M 50/446* (2021.01)
*H01M 10/052* (2010.01)
*H01M 12/08* (2006.01)
*H01M 10/056* (2010.01)

(52) U.S. Cl.
CPC ....... *H01M 50/446* (2021.01); *H01M 10/052* (2013.01); *H01M 10/056* (2013.01); *H01M 12/08* (2013.01); *H01M 2300/0065* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 4,183,988 A | * | 1/1980 | Farrington .............. H01M 6/18 252/519.33 |
| 7,306,879 B2 | | 12/2007 | Inda et al. |
| 7,670,724 B1 | | 3/2010 | Chan et al. |
| 7,998,622 B2 | | 8/2011 | Inda |
| 8,383,268 B2 | | 2/2013 | Inda |
| 8,476,174 B2 | | 7/2013 | Inda |
| 8,808,407 B2 | | 8/2014 | Inda |
| 8,822,077 B2 | | 9/2014 | Katoh |
| 8,883,355 B2 | | 11/2014 | Inda |
| 9,153,838 B2 | | 10/2015 | Ogasa |
| 9,413,033 B2 | | 8/2016 | Ogasa |
| 9,843,081 B2 | | 12/2017 | Kwon et al. |

(Continued)

FOREIGN PATENT DOCUMENTS

| JP | 5091458 B2 | 12/2012 |
|---|---|---|
| JP | 2012243743 A | 12/2012 |

(Continued)

*Primary Examiner* — Robert S Carrico
(74) *Attorney, Agent, or Firm* — Cantor Colburn LLP

(57) ABSTRACT

A composite membrane includes: an organic layer including a plurality of through holes; and ion conductive inorganic particles disposed in the plurality of through holes, wherein the ion conductive inorganic particles each include at least one recess, at least one protrusion, or a combination thereof on a surface thereof, and wherein the surface of the ion conductive inorganic particles which comprises the at least one recess, the at least one protrusion, or the combination thereof faces a surface of the organic layer.

20 Claims, 8 Drawing Sheets

(56) References Cited

U.S. PATENT DOCUMENTS

| | | | |
|---|---|---|---|
| 9,954,213 B2 | 4/2018 | Roumi | |
| 2007/0048617 A1 | 3/2007 | Inda | |
| 2008/0220334 A1* | 9/2008 | Inda | H01M 6/185 |
| | | | 429/322 |
| 2008/0241698 A1 | 10/2008 | Katoh | |
| 2008/0268346 A1 | 10/2008 | Inda | |
| 2009/0239153 A1 | 9/2009 | Inda | |
| 2012/0276459 A1* | 11/2012 | Im | H01M 10/0525 |
| | | | 429/405 |
| 2013/0052509 A1* | 2/2013 | Halalay | H01M 50/572 |
| | | | 429/129 |
| 2014/0023933 A1 | 1/2014 | Chiga et al. | |
| 2014/0065513 A1* | 3/2014 | Badding | C25B 13/04 |
| | | | 429/492 |
| 2014/0178777 A1* | 6/2014 | Lee | H01M 4/366 |
| | | | 429/405 |
| 2015/0255767 A1* | 9/2015 | Aetukuri | H01M 12/02 |
| | | | 429/249 |
| 2017/0005367 A1* | 1/2017 | Van Berkel | H01M 6/185 |
| 2017/0093002 A1* | 3/2017 | Choi | H01M 10/052 |
| 2018/0040904 A1 | 2/2018 | Choi et al. | |
| 2019/0326574 A1* | 10/2019 | Miller | H01M 50/403 |

FOREIGN PATENT DOCUMENTS

| | | | |
|---|---|---|---|
| JP | 5153065 B2 | 2/2013 | |
| JP | 5271668 B2 | 8/2013 | |
| JP | 5319879 B2 | 10/2013 | |
| JP | 5473537 B2 | 4/2014 | |
| JP | 2014060084 A | 4/2014 | |
| JP | 5616002 B2 | 10/2014 | |
| JP | 5721540 B2 | 5/2015 | |
| KR | 1020030093976 A | 12/2003 | |
| KR | 1020040047664 A | 6/2004 | |
| KR | 100500866 B1 | 7/2005 | |
| KR | 1020070026159 A | 3/2007 | |
| KR | 1020080044217 A | 5/2008 | |
| KR | 100942477 B1 | 2/2010 | |
| KR | 101130123 B1 | 3/2012 | |
| KR | 1020160136911 A | 11/2016 | |
| KR | 1020170050561 A | 5/2017 | |
| KR | 1020180014958 A | 2/2018 | |
| WO | 2012132934 A1 | 10/2012 | |

\* cited by examiner

COMPOSITE MEMBRANE, AND LITHIUM BATTERY INCLUDING THE COMPOSITE MEMBRANE

CROSS-REFERENCE TO RELATED APPLICATION

This application claims priority to and the benefit of Korean Patent Application No. 10-2019-0009234, filed on Jan. 24, 2019, in the Korean Intellectual Property Office, and all the benefits accruing therefrom under 35 U.S.C. § 119, the content of which is incorporated herein by reference in its entirety.

BACKGROUND

1. Field

The present disclosure relates to a composite membrane and a lithium battery including the composite membrane.

2. Description of the Related Art

A lithium-air battery includes an anode which allows deposition/dissolution of lithium ions, a cathode using oxygen in the air as a cathode active material and including a catalyst for oxidizing and reducing oxygen, and a lithium ion-conductive medium between the cathode and the anode.

A lithium-air battery has a theoretical specific energy of about 3,000 watt-hours per kilogram (Wh/kg) or greater, which is significantly higher than the specific energy of a lithium ion battery. Furthermore, a lithium-air battery is more environmentally friendly and is safer in than a lithium ion battery.

In a lithium-air battery, reaction of oxygen takes place in a cathode having an open structure, while reaction of lithium takes place in an anode. There remains a need for improved lithium-air battery materials capable of suppressing side reactions caused by oxygen while having good ionic conductivity.

SUMMARY

Provided is a composite membrane.

Provided is a lithium battery including the composite membrane.

Additional aspects will be set forth in part in the description which follows and, in part, will be apparent from the description, or may be learned by practice of the disclosed embodiment.

According to an aspect of an embodiment, a composite membrane includes: an organic layer including a plurality of through holes; and ion conductive inorganic particles disposed inside the plurality of through holes, wherein the plurality of ion conductive inorganic particles each have at least one recess and/or at least one protrusion on a surface thereof, the at least one recess and/or at least one protrusion respectively being recessed or protruding in a direction of the organic layer.

According to an aspect of another embodiment, a lithium battery includes the composite membrane.

According an aspect of an embodiment, a method of preparing the composite membrane includes: providing a first substrate comprising a plurality of openings having a predetermined pattern; disposing an ionic conductive particle precursor in the plurality of openings to provide a substrate comprising the ionic conductive particle precursor in the plurality of openings; thermally treating the substrate comprising the ionic conductive particle precursor in the plurality of openings to form a plurality of ion conductive inorganic particles; transferring the plurality of ion conductive inorganic particles to a second substrate; and forming an organic layer on the array of ion conductive inorganic particles on the second substrate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
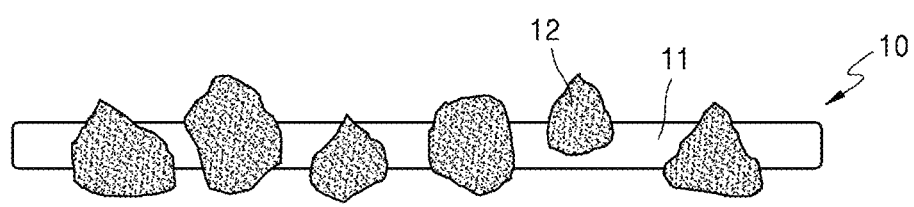
FIG. 1 is a schematic view for explaining a prior art composite membrane in which amorphous inorganic particles are disposed.

The present inventive concept will now be described more fully hereinafter with reference to the accompanying drawings, in which various example embodiments are shown. The present inventive concept may, however, be embodied in many different forms, and should not be construed as being limited to the embodiments set forth herein. Rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The sign "/" used herein may be construed as meaning of "and" or "or" depending on the situation.

In the drawings, the size, diameter, length, or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. In contrast, when an element is referred to as being "directly on" another element, there are no intervening elements present.

Although the terms "first", "second", etc., may be used herein to describe various elements, components, regions, and/or layers, these elements, components, regions, and/or layers should not be limited by these terms. These terms are used only to distinguish one component from another, not for purposes of limitation. The drawings may not illustrate every element and some elements may be missing, and are only intended to help with understanding of the disclosure, not to exclude elements.

In a lithium-air battery, there remains a need for an oxygen blocking layer capable of suppressing side reactions caused by oxygen while having good ionic conductivity. An oxide-based solid electrolyte has been used as a material in such an oxygen blocking layer. However, there have been many problems associated with the use of such a material, including high manufacturing costs, difficulty in increasing the size of the oxygen blocking layer, limitations in the shape of the oxygen blocking layer, susceptibility to damage due to weak mechanical strength, and limitations in reducing the weight and/or thickness of the solid electrolyte.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an embodiment of a composite membrane, a lithium battery including the composite membrane, and a method of preparing the composite membrane will be described in detail.

According to an aspect of the disclosure, a composite membrane includes: an organic layer including a plurality of through-holes; and a plurality of ion conductive inorganic particles disposed in the plurality of through-holes, wherein a surface of each of the plurality of ion conductive inorganic particles includes at least one recess, at least one protrusion, or a combination thereof, wherein the surface including the at least one recess, the at least one protrusion, or the combination thereof faces a surface of the organic layer. In an embodiment, an ion conductive inorganic particle of the plurality of ion conductive inorganic particles is disposed in a through hole of the plurality of through holes.

The composite membrane may have a structure in which the ion conductive inorganic particles penetrate the thickness of the organic layer from a front surface to a rear surface of the composite membrane, and thus each ion conductive inorganic particle of the plurality of ion conductive inorganic particles may be exposed at opposite surfaces of the composite membrane (e.g., exposed to an outside of the composite membrane). This structure of the ion conductive inorganic particles exposed at opposite surfaces of the composite membrane may ensure the migration path of lithium ions and thus improve conductivity of the composite membrane.

In a lithium-air battery according to the related art, a ceramic material layer is used to simultaneously perform ionic conduction and an oxygen blocking function. However, such a ceramic material layer has drawbacks such as a heavy weight, restrictions on its shape and size (e.g., relatively large size), and weak mechanical strength. Accordingly, the ceramic material layer is easily broken by external impact, and limitations in reducing the weight and/or thickness of the ceramic material layer have been barriers to commercialization.

Figure 2:
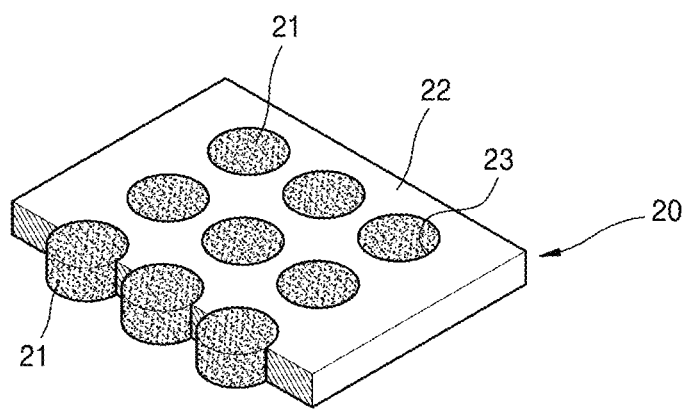
FIG. 2 is a schematic view for explaining a prior art composite membrane in which ion conductive inorganic particles are disposed.

Strategies attempting to improve the drawbacks related to the ceramic material layer, include those illustrated in FIGS. 1 and 2, in which a reduced weight has been implemented through an organic-inorganic composite membrane 10,20 including inorganic particles 12,21 in an organic layer 11,22. FIG. 1 is a schematic view explaining a composite membrane according to the prior art in which amorphous inorganic particles are disposed. FIG. 2 is a schematic view for explaining a composite membrane according to the prior art in which ion conductive inorganic particles are disposed. In the case of the prior art composite membrane in FIG. 1, due to the use of amorphous inorganic particles 12, the composite membrane 10 may include many sites where the strength of the composite membrane is weakened. In the case of the prior art composite membrane in FIG. 2, the contact area between the organic layer 22 and the inorganic particles 21 in through-holes 23 is not large, and as a result, the binding strength therebetween may be weak, leading to a reduced tensile strength of the composite membrane 20. The reduced strength of the composite membrane may consequently lead to deterioration in the characteristics of a battery including the composite membrane.

According to an embodiment, ion conductive inorganic particles having a surface including at least one recess, at least one protrusion, or a combination thereof are used to solve the above-described problems.

Figure 3A:
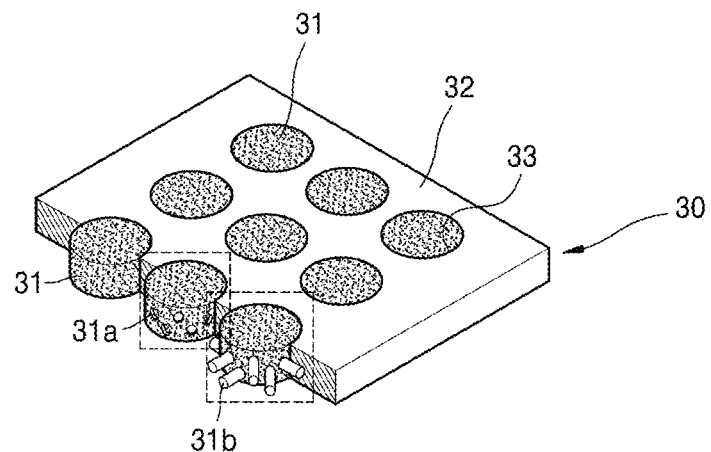
FIG. 3A is a schematic view for explaining a composite membrane according to an embodiment.

FIG. 3A is a schematic view for explaining a composite membrane 30 according to an embodiment. The "recess" or "protrusion" of the ion conductive inorganic particles according to an embodiment will be described in detail with reference to FIGS. 3B and 3C.

Referring to FIG. 3A, the composite membrane 30 according to an embodiment may include an organic layer 32 including a plurality of through-holes 33, and a plurality of ion conductive inorganic particle 31 disposed in the through-holes 33. For example, a single through hole of the plurality of through holes includes a single ion conductive inorganic particle of the plurality of ion conductive inorganic particles. The plurality of ion conductive inorganic particles may each include at least one recess 31a or protrusion 31b which may be recessed or protrude in a direction of the organic layer 32. The term "direction of the organic layer" used herein may refer to a lateral direction of the organic layer. For example, the surface of the ion conductive inorganic particles comprising the at least one recess, the at least one protrusion, or the combination thereof faces a surface of the organic layer.

Figure 3B:
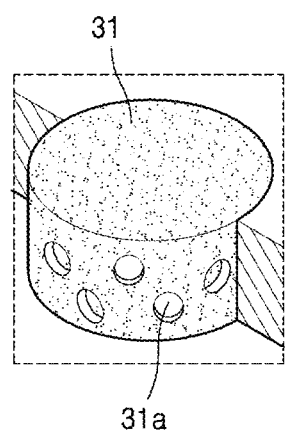
FIG. 3B is an enlarged view of an ion conductive inorganic particle in FIG. 3A including at least one recess.
Figure 3C:
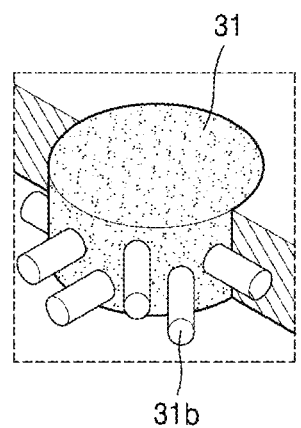
FIG. 3C is an enlarged view of an ion conductive inorganic particle in FIG. 3A including at least one protrusion.

As illustrated in FIGS. 3B and 3C, by the inclusion of the recess 31a or the protrusion 31b, the surface area of the ion conductive inorganic particles is effectively increased and thus a contact area between the organic layer 32 and the ion conductive inorganic particle 31 may also be increased, leading to increased binding strength between the organic layer 32 and the ion conductive inorganic particles 31.

As used herein, the term "recess" refers to a space or hollow defined in a surface of an ion conductive inorganic particle. As used herein, the term "protrusion" refers to a portion of an ion conductive inorganic particle which extends beyond (e.g., protrudes from) the surface of the ion conductive inorganic particle.

The ion conductive inorganic particles 31 may be exposed at the surfaces of the composite membrane 30 to provide ion migration paths, thus improving ionic conductivity of the composite membrane 30. In comparison with a ceramic material layer, the composite membrane 30 according to an embodiment may have reduced resistance, reduced weight, and a larger area. Due to the presence of the organic layer 32, the composite membrane 30 may have improved flexibility, improved mechanical strength, and may be processed freely such that free cell design is possible.

In an embodiment, the organic layer of the composite membrane 30 includes a polymer having barrier properties such as water vapor or moisture barrier properties and gas (oxygen, carbon dioxide) barrier properties. When the composite membrane includes a polymer which to blocks the movement of (e.g., is impermeable to) water vapor or moisture and gases such as oxygen, carbon dioxide, or the like in the organic layer 32, the composite membrane 30 may have an improved ability to block water vapor or moisture and gases. Accordingly, the composite membrane 30 according to an embodiment may be manufactured at a reduced cost, as compared with the ceramic material layer according to the related art. By using the composite membrane 30, a lithium battery may be manufactured to have a large surface area and a reduced weight, and as a thin film, and the manufacturing process thus may be simplified. Furthermore, by using the composite membrane 30, a lithium battery with improved lifetime characteristics may be manufactured.

In an embodiment, the composite membrane may have a first surface and a second surface, and the ion conductive inorganic particles are exposed at each of the first surface and the second surface, wherein the first surface is located at a side of the composite membrane which is opposite to that of the second surface. The at least one recess, the at least one protrusion, or the combination thereof may have a continuous structure extending from the first surface to the second surface. Alternatively, the at least one recess, the at least one protrusion, or the combination thereof may have a discontinuous structure from the first surface to the second surface.

The term "first surface" used herein may refer to an upper surface of the composite membrane 30, and the ion conductive inorganic particles 31 are exposed to the outside of the composite membrane at the upper surface. The term "second surface" may refer to a lower surface of the composite membrane 30, and the ion conductive inorganic particles 31 are exposed to the outside of the composite membrane at the lower surface.

Figure 4A:
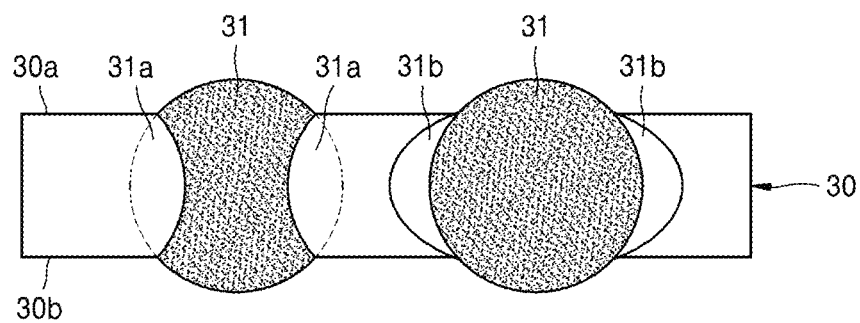
FIGS. 4A and 4B are cross-sectional views of composite membranes according to an embodiment.
Figure 4B:
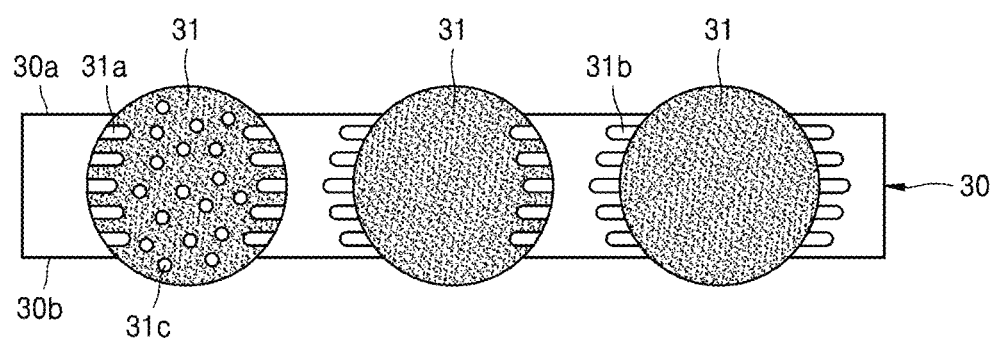

FIGS. 4A and 4B are cross-sectional views of composite membranes according to an embodiment.

To help understand the "continuous" structure extending from the first surface to the second surface, referring to FIG. 4A, a composite membrane 30 according to an embodiment may have a first surface 30a and a second surface 30b through which the ion conductive inorganic particles 31 are exposed. The first surface 30a and the second surface 30b are at opposite sides of the composite membrane 30 from one another, and the at least one recess 31a and the at least one protrusion 31b may have a continuous structure from the first surface 30a to the second surface 31b. As illustrated in FIG. 4A, the "continuous" structure refers to a single-layer structure in which the at least one recess 31a or the at least one protrusion 31b extends continuously from the first surface 30a to the second surface 30b of the composite membrane 30 without disconnection.

To help understand the "discontinuous" structure, referring to FIG. 4B, a composite membrane 30 according to an embodiment may have a first surface 30a and a second surface 30b through which the ion conductive inorganic particles 31 are exposed. The first surface 30a and the second surface 30b are at opposite sides of the composite membrane 30 from one another, and the recesses 31a or protrusions 31b may have a discontinuous structure from the first surface 30a to the second surface 30b. As illustrated in FIG. 4B, the "discontinuous" structure may refer to a structure in which the recesses 31a and/or the protrusions 31 are not continuously connected to one another from the first surface 30a to the second surface 30b of the composite membrane 30. Instead, the recesses 31a and/or the protrusions 31 are disconnected from one another at least one site.

For example, when the protrusions have a discontinuous structure as described above, the plurality of ion conductive inorganic particles may have a porous surface structure with a plurality of pores on each surface.

Referring to FIG. 4B, the protrusions 31b may form a discontinuous structure, and accordingly, surfaces of the ion conductive inorganic particles 31 may have a plurality of pores 31c. Each of the plurality of ion conductive inorganic particles 31 has a porous surface structure including a plurality of pores 31c on surfaces thereof.

For example, the first and/or second surfaces of the composite membrane may have a sea-island structure including a plurality of ion conductive inorganic particles disposed discontinuously in the continuous organic layer.

For example, a cross-section of the composite membrane may include an alternating aligned structure in which the plurality of ion conductive inorganic particles alternate with regions of the organic layer.

The plurality of ion conductive inorganic particles embedded in the organic layer may be disposed in the form of a monolayer.

The ion conductive inorganic particles may be disposed in the organic layer in a single-particle state without a grain boundary. Accordingly, no grain boundary may be observed in the ion conductive inorganic particles. The organic layer may be a dense layer having non-porous characteristics.

In an embodiment, the organic layer of the composite membrane may be a polymer layer including at least one selected from a homopolymer, a block copolymer, and a random copolymer, or a combination thereof.

Referring to FIGS. 3, 4A and 4B, the plurality ion conductive inorganic particles 31 may penetrate the thickness of the composite membrane 30 and be exposed on opposite surfaces of the composite membrane 30. In the manufacture of the composite membrane 30, the size of the through-holes 33 may be adjusted to fit to the size of the ion conducting organic particles 31.

For example, the plurality of ion conductive inorganic particles 31 may have a shape which is identical to the shape of the corresponding through-holes 33.

The composite membrane according to any of the above-described embodiment may be used as a water barrier film and/or as a gas barrier film for blocking the permeation of water (moisture) or the permeation of gases such as oxygen or carbon dioxide in a lithium-air battery. For example, ions (for example, lithium ions) may pass through an ion-conductive domain including the ion conductive inorganic particles 31, while water (moisture) and/or gas such as oxygen or carbon dioxide may be blocked by the organic layer 32. For example, the organic layer 32 may include a polymer having properties that block moisture and gas such as oxygen or carbon dioxide.

In an embodiment, the composite membrane may be used as a gas permeation blocking film in a lithium-air battery or as an anode protection film in a lithium secondary battery.

As used herein, the term "gas" may be construed as meaning any of oxygen, carbon dioxide, moisture, and water vapor.

The composite membrane according has a gas permeability of about $10^{-3}$ $cm^3/m^2$ day to about 1,000 $cm^3/m^2$ day, about $20^{-3}$ $cm^3/m^2$ day to about 800 $cm^3/m^2$ day, or about $50^{-3}$ $cm^3/m^2$ day to about 600 $cm^3/m^2$ day. Herein, the term "gas" is used as a meaning including oxygen, carbon dioxide, water, and moisture.

In an embodiment, the composite membrane has a water permeability of about 0.001 to about 1 gram of water per square meter per day ($g_{water}/m^2 \cdot day$), or about 0.01 to about 0.5 $g_{water}/m^2 \cdot day$.

As described above, the plurality of ion conductive inorganic particles 31 may be exposed at the first and second surfaces of the composite membrane 30. The area of the composite membrane at which the ion conductive inorganic particles 31 are exposed may be about 30% to about 80%, for example, about 40% to about 70%, or about 50% to about 60%, based on a total surface area of the composite membrane 30. When the exposed area of the ion conductive inorganic particles 31 is within these ranges, the composite membrane 30 may have improved ionic conductivity.

In an embodiment, a thickness of an ion conductive inorganic particle in the composite membrane may correspond to a height difference between the upper and lower surfaces of the ion conductive inorganic particle, and the thickness of the ion conductive inorganic particle may be the same as the thickness of the organic layer. When the ion conductive inorganic particles 31 and the organic layer 32 have the same thickness, binding of the composite membrane 30 to other elements may be facilitated, and thus, the binding strength (force) may be improved.

In an embodiment, the thickness of the ion conductive inorganic particles is different from the thickness of the organic layer.

For example, the organic layer may have a thickness of about 10 to about 200 micrometers (μm), about 20 to about 150 μm, or about 50 to about 120 μm, or about 90 μm, and the thickness of the ion conductive inorganic particles is about 10 to about 200 μm, about 20 to about 150 μm, about 50 to about 120 μm, or about 95 μm The ion conductive inorganic particles 31 may form an ion-conductive region, and the organic layer 32 may form a non-ion-conductive region. The ion-conductive region and the non-ion-conductive region may be disposed to contact each other in a thickness direction (Y) of the composite membrane and form a bicontinuous structure.

The term "bicontinuous structure" denotes a structure in which the ion conductive inorganic particles as at least one ion-conductive region and the organic layer as at least one non-ion-conductive region are interconnected and in contact with each other.

The ion conductive inorganic particles 31 may be in a single-particle state (e.g., a single particle) without a grain boundary, as illustrated in FIG. 3.

For example, the plurality of ion conductive inorganic particles 31 may have an identical shape, as illustrated in FIGS. 3, 4A, and 4B, or may have different shapes. However, an embodiment is not limited thereto.

In an embodiment, each ion conductive inorganic particle of the plurality of ion conductive inorganic particles may have an upper surface and a lower surface. For example, the upper and lower surfaces of a first ion conductive inorganic particle may have a surface area and/or a shape which is the same as the second ion conductive inorganic particle. However, an embodiment is not limited thereto. For example, the upper and lower surfaces of a first ion conductive inorganic particle may have a surface area and/or a shape which is different from a second ion conductive inorganic particle. However, an embodiment is not limited thereto.

In an embodiment, each of the plurality of ion conductive inorganic particles may have an upper surface and/or a lower surface having a same surface area and/or a same shape. In this case, not only are the ion conducting ionic particles capable of being packed efficiently in a relatively high density, but formation of openings in a substrate may be simplified in a process of manufacturing the composite membrane, which will be described later.

The shape of the plurality of ion conductive inorganic particles are not limited to those illustrated in FIGS. 3, 4A, and 4B. The plurality of ion conductive inorganic particles may have any suitable shape. For example, the ion conductive inorganic particles may have any vertical cross-sectional shape and/or a horizontal cross-sectional shape, such as a circular shape, a triangular shape, a quasi-triangular shape, a triangular shape with semi-circles, a triangular shape with one or more rounded corners, a square shape, a rectangular shape, a rectangular shape with semi-circles, a polygonal shape, or a combination thereof. For example, the ion conductive inorganic particles may have any of a variety of shapes, such as a cubic shape, a spherical shape, a circular shape, an elliptical shape, a rod shape, a stick shape, a tetrahedral shape, a pyramidal shape, an octahedral shape, a cylindrical shape, a polygonal shape, a pillar shape, a polygonal pillar-like shape, a conical shape, a columnar shape, a tubular shape, a helical shape, a funnel shape, a dendritic shape, a rod shape, or a combination thereof.

The size of the ion conductive inorganic particles refers to an average particle diameter when the ion conductive inorganic particle has a spherical shape. When the ion conductive inorganic particle has a different shape (e.g., non-spherical shape), the size of the ion conductive inorganic particle refers to an average length of a major (longer) axis.

Referring to FIG. 4A, a length of the at least one recess $31a$ or a length of the at least one protrusion ($31b$ may be about 10% to about 50%, or about 15% to about 50%, or about 20% to about 50%, of the average particle diameter of the inorganically conducting inorganic particles $31$ including the at least one recess, the at least one protrusion, or a combination thereof. When the recess length of the at least one recess or the protrusion length of the at least one protrusion $31b$ is outside of this range, for example, less than 10% of the average particle diameter of the ion conductive inorganic particles having the recesses and/or the protrusions, the contact area between the organic layer $32$ and the plurality of ion conductive inorganic particles $31$ may not be large enough to impart improved binding strength between the ion conductive inorganic particles $31$ and the organic layer $32$. On the other hand, when a recess length of the at least one recess or a protrusion length of the at least one protrusion is greater than 50%, the ion conductive inorganic particles $31$ may have reduced structural stability, and a total volume of the ion conductive inorganic particles $31$ passing through the composite membrane $30$ may be reduced, leading to deteriorated ion conductivity characteristics.

In an embodiment, the plurality of ion conductive inorganic particles $31$ may each includes a plurality of recesses $31a$, a plurality of protrusions $31b$, or a combination thereof. The plurality of recesses $31a$ or the plurality of protrusions $31b$ of each ion conductive inorganic particle $31$ may have an identical shape or a different shape. For example, each recess of the plurality of recesses has an identical shape or a different shape, and/or each protrusion of the plurality of protrusions has an identical shape or a different shape.

The occupation area of the recesses and/or the protrusions refers to the percentage of the total surface area of the ion conductive inorganic particles which is occupies by the at least one recess, the at least one protrusion, or the combination thereof. An occupation area of the recesses may be about 5% to about 30%, or about 10% to about 30%, or about 10% to about 25%, based on a total surface area of the ion conductive inorganic particles with the recesses $31a$.

An occupation area of the protrusions $31b$ may be about 5% to about 50%, or about 10% to about 50%, or about 15% to about 40%, based on a total surface area of the ion conducting ionic particles with the protrusions $31b$.

When the occupation area of the recesses $31a$ is outside of the above range, for example, exceeds 30% based on the total surface area of the ion conductive inorganic particles with the recesses $31a$, the inorganically conducting inorganic particles may have reduced structural stability and a reduced ion conduction area. When the occupation area of the protrusions $31b$ is increased relative to the total surface area of the ion conducting ionic particles having the protrusions $31b$, the binding strength with the adjacent organic layer $32$ may be improved without deterioration in the structural stability of the ion conducting ionic particles. However, when the occupation area of the protrusions $31b$ exceeds 50% based on the total surface area of the ion conducting ionic particles having the protrusions $31b$, the non-protrusion regions (e.g., regions without a protrusion) of the ion conducting ionic particles having the protrusions $31b$ may also function as a recess, causing the above-described problems.

On the other hand, when the occupation area of the recesses $31a$ or the protrusions $13b$ is less than the total surface area of the ion conducting ionic particles having the recessions $31a$ or the protrusions $31b$, the contact area between the organic layer $32$ and the ion conductive inorganic particles $31$ may not be sufficient to impart improved binding strength between the ion conductive inorganic particles $31$ and the organic layer $32$.

In an embodiment, the ion conductive inorganic particles may be lithium-ion conducting inorganic particles.

In an embodiment, an amount of the ion conductive inorganic particles may be about 10 parts by weight to about 90 parts by weight, or about 20 parts by weight to about 100 parts by weight, or about 30 parts by weight to about 50 parts by weight, based on 100 parts by weight of the composite membrane. When the amount of the ion conductive inorganic particles is within this range, the composite membrane may have improved ionic conductivity and mechanical strength.

In an embodiment, the ion conductive inorganic particles may include a glassy active metal ion conductor, an amorphous active metal ion conductor, a ceramic active metal ion conductor, and a glass-ceramic active metal ion conductor, or a combination thereof.

In an embodiment, the ion conductive inorganic particles may include $Li_{1+x+y}Al_xTi_{2-x}Si_yP_{3-y}O_{12}$ (wherein $0<x<2$ and $0\leq y<3$), $BaTiO_3$, $Pb(Zr_aTi_{1-a})O_3$ $0\leq a\leq 1$ (PZT), $Pb_{1-x}La_xZr_{1-y}Ti_yO_3$ (PLZT) (wherein $0\leq x<1$ and $0\leq y<1$), $Pb(Mg_{3}Nb_{2/3})O_{3}$—$PbTiO_{3}$ (PMN-PT), $HfO_{2}$, $SrTiO_{3}$, $SnO_{2}$, $CeO_{2}$, $Na_{2}O$, $MgO$, $NiO$, $CaO$, $BaO$, $ZnO$, $ZrO_{2}$, $Y_{2}O_{3}$, $Al_{2}O_{3}$, $TiO_{2}$, $SiO_{2}$, SiC, lithium phosphate ($Li_{3}PO_{4}$), lithium titanium phosphate ($Li_{x}Ti_{y}(PO_{4})_{3}$, wherein $0<x<2$ and $0<y<3$), lithium aluminum titanium phosphate ($Li_{x}Al_{y}Ti_{z}(PO_{4})_{3}$, wherein $0<x<2$, $0<y<1$, and $0<z<3$), $Li_{1+x+y}(Al, Ga)_{x}(Ti, Ge)_{2-x}Si_{y}P_{3-y}O_{12}$ (wherein $0\leq x\leq 1$ and $0\leq y\leq 1$), lithium lanthanum titanate ($Li_{x}La_{y}TiO_{3}$, (wherein $0<x<2$ and $0<y<3$), lithium germanium thiophosphate ($Li_{x}Ge_{y}P_{z}S_{w}$, wherein $0<x<4$, $0<y<1$, $0<z<1$, and $0<w<5$), lithium nitride glass ($Li_{x}N_{y}$, wherein $0<x<4$ and $0<y<2$), $SiS_{2}$ glass ($Li_{x}Si_{y}S_{z}$, wherein $0<x<3$, $0<y<2$, and $0<z<4$), $P_{2}S_{5}$ glass ($Li_{x}P_{y}S_{z}$, wherein $0<x<3$, $0<y<3$, and $0<z<7$), $Li_{2}O$, LiF, LiOH, $Li_{2}CO_{3}$, $LiAlO_{2}$, a $Li_{2}O$—$Al_{2}O_{3}$—$SiO_{2}$—$P_{2}O_{5}$—$TiO_{2}$—$GeO_{2}$ ceramic, a Garnet ceramic ($Li_{3+x}La_{3}M_{2}O_{12}$, wherein M may be Te, Nb, or Zr, and x may be an integer from 1 to 10), or a combination thereof. For example, the Garnet ceramic may be $Li_{7}La_{3}Zr_{2}O_{12}$.

As described above, the ion conductive inorganic particles may not have a grain boundary. This may ensure the composite membrane including the ion conductive inorganic particles provides a lithium ion conduction path with reduced resistance. Accordingly, conduction and migration of lithium ions may be facilitated, and lithium-ion conductivity and a lithium-ion transfer rate of the composite membrane may be markedly improved. Compared with a membrane including only inorganic particles, the composite membrane according to an embodiment may have improved flexibility and mechanical strength.

The ion conductive inorganic particles may be in a single-particle state without a grain boundary, which may be identified by scanning electron microscopy (SEM).

In an embodiment, the ion conductive inorganic particles may have an average particle diameter of about 1 μm to about 500 μm. For example, the ion conductive inorganic particles may have an average particle diameter of about 1 μm to about 300 μm, for example, about 1 μm to about 200 μm, or for example, about 1 μm to about 150 μm. When the ion conductive inorganic particles have an average particle diameter within these ranges, it may be relatively easy to prepare the composite membrane including the ion conductive inorganic particles in a single-particle state without grain boundary by employing, for example, a grinding process.

In an embodiment, the size of the ion conductive inorganic particles may be uniform and may be maintained to be uniform in the composite membrane. For example, the ion conductive inorganic particles may have a D50 particle size of about 110 μm to about 130 μm, a D90 particle size of about 180 μm to about 200 μm, and a D10 particle size of about 60 μm to about 80 μm. The terms "D50 particle size," "D10 particle size," and "D90 particle size" used herein refer to a particle size (diameter) corresponding to 50 volume %, 10 volume %, and 90 volume %, respectively, of the particles in a cumulative distribution curve of the ion conductive inorganic particles according to size (diameter).

In the composite membrane according to an embodiment, the organic layer includes a polymer, and the polymer may be selected from a variety of suitable polymers based upon the intended use of the organic layer.

When the polymer has barrier properties and is capable of blocking at least one of a gas, water (moisture), or a combination thereof, the organic layer may be capable of blocking, for example, an anode corrosive gas. The anode corrosive gas may be, for example, water vapor, carbon dioxide, oxygen, or a combination thereof. Accordingly, the organic layer may function as an oxygen barrier membrane, a moisture blocking membrane, or a carbon dioxide barrier membrane.

The polymer capable of blocking gas and/or water may be, for example, a polymerization product of a polymerizable non-aqueous floating compound.

The polymerizable non-aqueous floating compound may be a material including a polymerizable organic monomer which floats in water, has non-volatile and non-aqueous characteristics, and has at least two polymerizable functional groups. The polymerization may include both copolymerization and cross-linking. For example, the polymerizable non-aqueous floating compound may include: i) a polymerization product of at least one polyfunctional monomer; or ii) a polymerization product of at least one polyfunctional monomer and a polythiol having 3 or 4 thiol groups. The at least one polyfunctional monomer may include a polyfunctional acryl monomer, a polyfunctional vinyl monomer, or a combination thereof.

As used herein, the term "polyfunctional monomer" refers to a monomer including more than one functional group. The functional group may be, for example, an acryl group or a vinyl group.

As used herein, an "acryl" group includes acrylic, methacrylic, (C1 to C20 alkyl)acrylate, and (C1 to C20alkyl) methacrylate.

As used herein, a vinyl monomer refers to a monomer including a vinyl group. A "vinyl" group includes any group having terminal unsaturation (—$CH_{2}$=$CH_{2}$), including acrylate groups (—OC(O)CH=$CH_{2}$) and methacrylate (—OC(O)($CH_{3}$)=$CH_{2}$) groups.

The polymerizable non-aqueous floating compound may refer to a hydrophobic compound.

The polyfunctional acrylic monomer may be at least one of diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, or bisphenol A diacrylate.

Non-limiting examples of the polyfunctional vinyl monomer are 1,3,5-trially-1,3,5-triazine-2,4,6-trione and 3-methacrylpropyltrimethoxysilane.

The polythiol may include, for example, at least one of pentaerythritol tetrakis(3-mercaptopropionate), trimethylolpropane tris(3-mercaptopropionate), 4-mercaptomethyl-3,6-dithia-1,8-octanedithiol, pentaerythritol tetrakis(2-mercaptoacetate), or trimethylolpropane tris(2-mercaptoacetate).

The organic layer may include a polymerization product of pentaerythritol tetrakis(3-mercaptopropionate) and 1,3,5-triallyl-1,3,5-triazine-2,4,6-trione.

The polymerizable non-aqueous floating compound may have a water solubility of about 0.0001 grams per liter (g/l) to about 0.025 g/l. When the polymerizable non-aqueous floating compound includes pentaerythritol tetrakis(3-mercaptopropionate), the compound may have a water solubility of about 0.00369 g/l. When the polymerizable non-aqueous floating compound includes 1,3,5-triallyl-1,3,5-triazine-2,4,6-trione (TTT), the compound may have a water solubility of about 0.001 g/l. When the polymerizable non-aqueous floating compound includes trimethylolpropane trimethacrylate, the compound may have a water solubility of about 0.0201 g/l.

In an embodiment, the composite membrane may be used as an anode protection layer in a lithium secondary battery, such as a lithium sulfur secondary battery or an aqueous lithium ion secondary battery. In an embodiment, the composite membrane may be used to separate a cathode, an anode, and an electrolyte to thereby improve performance of a lithium ion battery.

When the composite membrane according to an embodiment is used as a protective membrane in a lithium sulfur secondary battery or an aqueous lithium ion secondary battery, the organic layer may form a non-ion conducting domain.

In the composite membrane according to an embodiment, an amount of the organic layer may be about 10 parts by weight to about 80 parts by weight, for example, about 50 parts to about 80 parts by weight, with respect to 100 parts by weight of a total weight of the composite membrane. When the amount of the organic layer is within these ranges, the composite membrane may have improved lithium-ion conductivity, flexibility, and gas blocking ability without deterioration in film formability.

In an embodiment, the polymer constituting the organic layer may have a weight average molecular weight of about 10,000 grams per mole (g/mol) to about 300,000 g/mol, or about 15,000 g/mol to about 25,000 g/mol, as measured by gel permeation chromatography (GPC) using a polystyrene standard. When the polymer has a weight average molecular weight within this range, a composite membrane having improved ionic conductivity and improved gas and moisture blocking ability may be manufactured without deterioration in film formability.

In an embodiment, the composite membrane may include the ion conductive inorganic particles at a high density, and thus may have reduced resistance.

In an embodiment, the composite membrane may have a weight of about 5 milligrams per square centimeter (mg/cm$^2$) to about 20 mg/cm$^2$, or about 7 mg/cm$^2$ to about 18 mg/cm$^2$, or for example, about 11 mg/cm$^2$ to about 16 mg/cm$^2$. When the composite membrane has a weight within these ranges, a thin-film, lightweight lithium-air battery may be manufactured using the composite membrane.

In an embodiment, the composite membrane may have a thickness of about 10 μm to about 200 μm, or about 50 μm to about 150 μm, or for example, about 70 μm to about 100 μm. When the composite membrane has a thickness within these ranges, the composite membrane may have improved ionic conductivity and improved moisture and gas blocking characteristics.

In an embodiment, the composite membrane may be a foldable flexible membrane. Due to flexibility of the composite membrane, the composite membrane may be applicable to a folding cell.

In an embodiment, the composite membrane may have a tensile strength of about 1 mega pascal (MPa) or greater, about 2 MPa or greater, about 3 MPa or greater, about 4 MPa or greater, about 5 MPa or greater, about 6 MPa or greater, about 7 MPa or greater, or about 8 MPa or greater, or about 1 MPa to about 50 MPa, or about 5 MPa to about 50 MPa, or about 8 MPa to about 50 MPa. When the composite membrane has an increased tensile strength within these ranges, the composite membrane may provide improved mechanical properties. For example, the composite membrane may have a yield strain of about 1% or greater, about 1.5% or greater, about 2% or greater, or about 2.5% or greater, or about 1% to about 20%, or about 2% to about 20%, or about 2.5% to about 20%. When the composite membrane has an improved yield strain with these ranges, the composite membrane may be flexible to be bendable or foldable, and thus be applicable for various purposes.

In the composite membrane according to an embodiment, an area of the plurality of ion conductive inorganic particles exposed at surfaces of the composite membrane may be about 30% to about 80% based on a total area of the composite membrane.

According to another aspect of the present disclosure, a lithium battery includes the composite membrane according to the above-described embodiment.

In an embodiment, the lithium battery may be a lithium-air battery. For example, the lithium-air battery may include an anode, the composite membrane according to the above-described embodiment, and a cathode using oxygen as a cathode active material.

A lithium-air battery uses an aqueous electrolyte or a non-aqueous electrolyte as an electrolyte interposed between a cathode and an anode.

When the electrolyte of a lithium-air battery is a non-aqueous electrolyte, the reaction mechanism may be represented by Reaction Scheme 1.

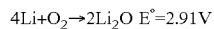

                    Reaction Scheme 1

During discharge of the lithium-air battery, lithium from the anode reacts with oxygen from the cathode to form lithium oxide, and reduction of oxygen occurs. Conversely, during charge of the lithium-air battery, the lithium oxide is reduced while oxygen is oxidized.

In an embodiment, the lithium-air battery may have any of a variety of shapes, and is not specifically limited. For example, the lithium-air battery may have a shape of a coin, a button, a sheet, a stack, a cylinder, a plane, or a horn. The lithium-air battery may be applicable as a large battery for use in an electric vehicle.

Figure 5:
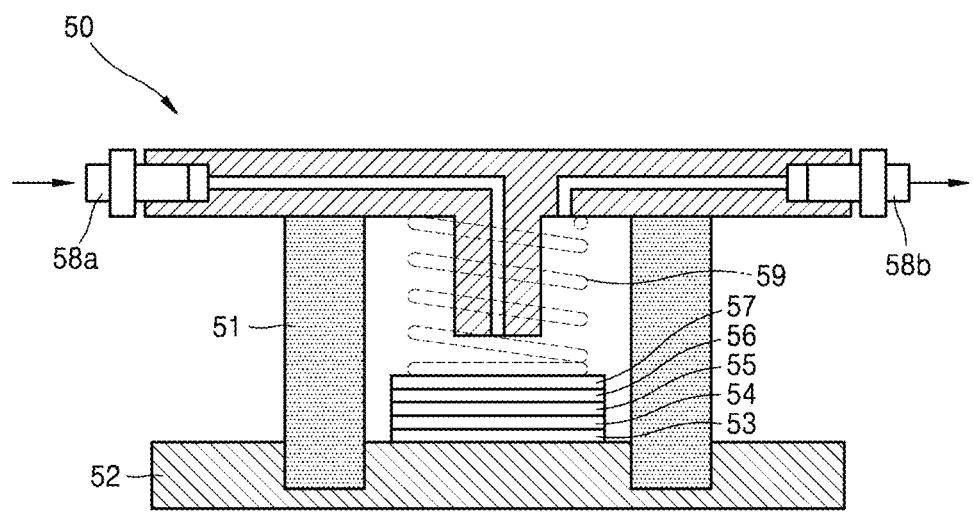
FIG. 5 is a schematic view of a lithium-air battery employing a composite membrane according to an embodiment.

Referring to FIG. 5, a lithium-air battery 50 according to an embodiment may include a composite membrane 55 according to the above-described embodiment between a cathode 57 using oxygen as an active material and an anode 53 disposed on a substrate 52. An electrolyte 54 may be disposed between the anode 53 and the composite membrane 55. The anode 53, the electrolyte 54, and the composite membrane 55 may constitute a protected anode. The electrolyte 54 may have good lithium ion conductivity and low resistance per unit area when combined with the anode 53. In an embodiment, the lithium-air battery 50 may further include a lithium ion-conductive solid electrolyte membrane (not shown) or a separator (not shown) between the anode 53 and the electrolyte 54 or between the electrolyte 54 and the composite membrane 55. The cathode 57 may include a current collector and a pressing member 59 for transferring air to the cathode 57, and the pressing member 59 may be on the current collector. The cathode 57 and the anode 53 may be accommodated in a case 51 made of an insulating resin. Air may be supplied via an air inlet 58a and may be discharged through an air outlet 58b. As used herein, the term "air" includes atmospheric air, pure oxygen gas, and a combination of gases including oxygen. An electrolyte 56 may be between the composite membrane 55 and the cathode 57. In an embodiment, the lithium-air battery 50 may further include a lithium ion-conductive solid electrolyte membrane (not shown) or a separator (not shown) between the cathode 57 and the electrolyte 56 or between the electrolyte 56 and the composite membrane 55. In an embodiment, the composite membrane 55 may be on a surface of the anode 53 to serve as a protective layer for protecting the lithium of the anode 53 from the electrolyte 54. The composite membrane 55 may be a single layer or a multiple layers.

In an embodiment, the electrolytes 54 and 56 may each be a polymer solid electrolyte. The polymer solid electrolyte may be a polyethylene oxide doped with a lithium salt. For example, the lithium salt may include $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_2F)_2$, $LiC_4F_9SO_3$, or $LiAlCl_4$.

In an embodiment, the electrolytes 54 and 56 may each be a liquid electrolyte including a solvent and a lithium salt. The solvent may include an aprotic solvent, water, or a combination thereof. Non-limiting examples of the aprotic solvent include a carbonate-based solvent, an ester-based solvent, an ether-based solvent, a ketone-based solvent, an amine-based solvent, a phosphine-based solvent, or a combination thereof. Non-limiting examples of the carbonate-based solvent are dimethyl carbonate (DMC), diethyl carbonate (DEC), ethyl methyl carbonate (EMC), dipropyl carbonate (DPC), methylpropyl carbonate (MPC), ethylpropyl carbonate (EPC), ethylene carbonate (EC), propylene carbonate (PC), and butylene carbonate (BC). Non-limiting examples of the ester-based solvent are methyl acetate, ethyl acetate, n-propyl acetate, tert-butyl acetate, methyl propionate, ethyl propionate, γ-butyrolactone, decanolide, valerolactone, mevalonolactone, and caprolactone. Non-limiting examples of the ether-based solvent are dibutyl ether, tetraglyme, diglyme, dimethoxyethane, 2-methyltetrahydrofuran, and tetrahydrofuran. For example, the ketone-based solvent may be cyclohexanone. Non-limiting examples of the amine-based solvent are triethylamine and triphenylamine. For example, the phosphine-based solvent may be triethylphosphine. However, an embodiment are not limited thereto. Any appropriate aprotic solvent available in the art may be used. Non-limiting examples of the aprotic solvent are nitriles, for example, represented by R—CN (wherein R is a C2-C30 linear, branched, or cyclic hydrocarbon group which may include a double-bond, an aromatic ring, or an ether bond); amides such as N,N-dimethylformamide; dioxolanes such as 1,3-dioxolane; and sulfolanes.

The above-listed aprotic solvents may be used alone or as a combination including at least one of the foregoing solvents. When one or more aprotic solvents are used together, a mixing ratio of the aprotic solvents may be appropriately adjusted according to the performance of a battery. This can be determined by one of skill in the art without undue experimentation.

In an embodiment, the electrolytes 54 and 56 may each include an ionic liquid. For example, the ionic liquid may be a linear or branched, substituted compound including a cation of ammonium, imidazolium, pyrrolidinium pyridinium, or piperidinium; and an anion such as $PF_6^-$, $BF_4^-$, $CF_3SO_3^-$, $(CF_3SO_2)_2N^-$, $(C_2F_5SO_2)_2N^-$, $(FSO_2)_2N^-$, or $(CN)_2N^-$.

In an embodiment, the electrolytes 54 and 56 may be partially or completely impregnated into the anode 53 and the cathode 57, respectively.

In an embodiment, the electrolytes 54 and 56 may each be a lithium ion-conductive solid electrolyte membrane. For example, the lithium ion-conductive solid electrolyte membrane may include an inorganic material including a lithium-ion conducting glass, a lithium-ion conducting crystal (ceramic or glass-ceramic), or a combination thereof. To provide chemical stability, the lithium ion-conductive solid electrolyte membrane may include an oxide.

When the lithium ion-conductive solid electrolyte membrane includes a large amount of lithium-ion conducting crystals, improved ionic conductivity may be obtained. For example, the amount of the lithium-ion conducting crystals may be about 50 weight percent (wt %) or greater, about 55 wt % or greater, or about 60 wt % or greater, based on a total weight of the lithium ion-conductive solid electrolyte membrane, for example, about 50 wt % to about 75%, or about 60 wt % to about 70 wt %. For example, the lithium-ion conducting crystals may be crystals having a perovskite structure and lithium-ion conductivity, for example, $Li_3N$, a lithium ion super ionic conductor (LISICON) material, or $La_{0.55}Li_{0.35}TiO_3^-$; $LiTi_2P_3O_{12}$ having a NASICON (sodium super ionic conductor)-type structure; or a glass-ceramic which can precipitate these crystals. For example, the lithium-ion conducting crystals may include $Li_{1+x+y}(Al, Ga)_x(Ti, Ge)_{2-x}Si_yP_{3-y}O_{12}$ (wherein 0≤x≤1 and 0≤y≤1 for example, 0≤x≤0.4 and 0<y≤0.6, or 0.1≤x≤0.3 and 0.1≤y≤0.4). To have increased ionic conductivity, the lithium-ion conducting crystals do not have a grain boundary that may interrupt ion conduction. For example, the glass-ceramic having substantially no pore or grain boundary, which interrupts ionic conduction, may have high ionic conductivity and good chemical stability.

For example, the lithium-ion conducting glass-ceramic may be lithium-aluminum-germanium-phosphate (LAGP), lithium-aluminum-titanium-phosphate (LATP), or lithium-aluminum-titanium-silicon-phosphate (LATSP). For example, when a parent glass having the composition of $Li_2O$—$Al_2O_3$—$TiO_2$—$SiO_2$—$P_2O_5$ is crystallized by thermal treatment, the resulting main crystal phase may be $Li_{1+x+y}Al_xTi_{2-x}Si_yP_{3-y}O_{12}$ (wherein 0≤x≤2 and 0≤y≤3). For example, in the formula of $Li_{1+x+y}Al_xTi_{2-x}Si_yP_{3-y}O_{12}$, x and y may satisfy, for example, 0≤x≤0.4 and 0<y≤0.6; or 0.1≤x≤0.3 and 0.1<y≤0.4.

A glass ceramics having substantially no pores or grain boundaries which interrupt ion conduction refers to a glass ceramic ionic conduction-interrupting material having a pore or a grain boundary that reduces a total ion conductivity of an inorganic material including lithium-ion conducting crystals to a level of one-tenth (1/10) or less of the conductivity of only the lithium-ion conducting crystals in the inorganic material.

The cathode 57 using oxygen as a cathode active material may include a conductive (electrically conductive) material. For example, the conductive material may be porous. Any suitable conductive material which is both porous and electrically conductive may be used without limitation.

For example, the conductive material may be a carbonaceous conductive material having porosity. Examples of the carbonaceous conductive material may be carbon black, graphite, graphene, activated carbon, or a carbon fiber. However, an embodiment is not limited thereto. For example, the conductive material may be a metallic conductive material such as a metal fiber, metal mesh, or the like. The metallic conductive material may be a metal powder, for example, copper, silver, nickel, or aluminum in powder form. For example, the conductive material may be an organic conductive material, for example, polyphenylene derivatives. For example, the above-listed conductive materials may be used alone or in a combination thereof.

In an embodiment, the cathode 57 may further include a catalyst for oxidation/reduction of oxygen. Examples of the catalyst may include: a precious metal-based catalyst such as platinum, gold, silver, palladium, ruthenium, rhodium, and osmium; an oxide-based catalyst such as manganese oxide, iron oxide, cobalt oxide, and nickel oxide; and an organic metal-based catalyst such as cobalt phthalocyanine. However, an embodiment is not limited thereto. Any catalyst suitable for the oxidation/reduction of oxygen used may be used.

In an embodiment, the catalyst may be supported on a catalyst support. The catalyst support may be an oxide, a zeolite, a clay-based mineral, carbon, or the like. The oxide may be a metal oxide including at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of carbon as the catalyst support may include carbon black such as Ketjen black, acetylene black, channel black, and lamp black; graphite such as natural graphite, artificial graphite, and expandable graphite; an activated carbon; and a carbon fiber. However, an embodiment is are not limited thereto. Any suitable catalyst support may be used.

In an embodiment, the cathode may further include a binder. For example, the binder may include a thermoplastic resin or a thermocurable resin. For example, the binder may be polyethylene, polypropylene, polytetrafluoroethylene (PTFE), polyvinylidene fluoride (PVdF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, an embodiment is not limited thereto. Any suitable binder art may be used.

In an embodiment, the cathode 57 may be manufactured by mixing a catalyst for oxidation/reduction of oxygen, a conductive material, and a binder together, adding an appropriate solvent thereto to prepare a cathode slurry, coating the cathode slurry on a surface of a current collector, and drying the coated resultant, and optionally compression-molding the dried product on the current collector to increase the electrode density. For example, the cathode 57 may include a lithium oxide. For example, the catalyst for oxidation/reduction of oxygen may be omitted.

To facilitate diffusion of oxygen, a porous structure in a matrix or mesh form may be used as the current collector. For example, a porous metal plate of stainless steel, nickel, aluminum, or the like may be used. However, an embodiment is not limited thereto. Any material suitable for use as a current collector may be used. For example, to prevent oxidation, the current collector may be coated with an anti-oxidation metal or an alloy-coated layer.

In an embodiment, the anode 53 of the lithium-air battery 50 may be a lithium-containing anode. The lithium-containing anode may include, for example, lithium metal or a lithium metal-based alloy, and is a material which allows deposition/dissolution of lithium. However, an embodiment is not limited thereto. For example, any material suitable for an anode, for example, a material including lithium or allowing deposition/dissolution of lithium, may be used. The capacity of the lithium-air battery may be determined by the anode. For example, the anode may be, for example, a lithium metal thin film. The lithium metal-based alloy may be, for example, an alloy of lithium with at least one of aluminum (Al), tin (Sn), magnesium (Mg), indium (In), calcium (Ca), titanium (Ti), and vanadium (V).

In an embodiment, a separator (not shown) may be disposed between the cathode 57 and the anode 53 in the lithium-air battery 50. The separator may have any composition durable under operation environments of the lithium-air battery 50. For example, the separator may be a polymer-based non-woven fabric such as a polypropylene-based non-woven fabric or polyphenylene sulfide-based non-woven fabric, or a porous film of an olefin-based polymer such as polypropylene or polyethylene. These materials may be used alone or in a combination of at least two thereof.

In an embodiment, the lithium battery may be an all-solid battery.

Figure 6:
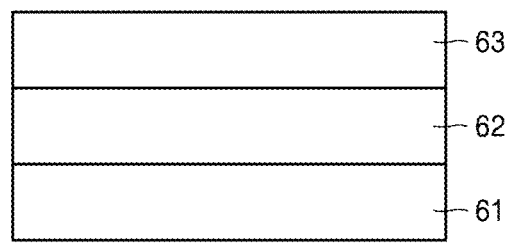
FIG. 6 is a schematic view of an all-solid battery employing a composite membrane according to an embodiment.

Referring to FIG. 6, an all-solid battery according to an embodiment may include an anode 61, a cathode 63, and an electrolyte layer 62 between the anode 61 and the cathode 63.

When the anode 61 is lithium metal, the composite membrane according to the disclosed embodiment may be included in the anode 63 and/or in the electrolyte layer 62.

The cathode 63 may include a cathode active material, the composite material according to an embodiment, a conductive material, and a binder. A cathode active material suitable for an all-solid lithium battery may be a material having high lithium conductivity and exhibiting a relatively high voltage with respect to lithium metal. In contrast, the cathode active material may not be ion conductive and may be electronically conductive.

The anode 61 may include an anode active material, and optionally includes the composite membrane according to the embodiment, a conductive material, and a binder. Non-limiting examples of the anode active material are metal lithium, a metal active material, and a carbonaceous active material. Non-limiting examples of the metal active material may include In, Al, Si, and Sn. Non-limiting examples of the carbonaceous active material may include a mesocarbon microbead (MCMBs), a highly oriented pyrolytic graphite (HOPG), a hard carbon, and a soft carbon. The conductive material and the binder used in the anode may be the same as or similar to those contained in the cathode. Non-limiting examples of a material for an anode current collector may include copper, nickel, and carbon.

In an embodiment, the lithium battery may be a lithium sulfur secondary battery or a lithium ion secondary battery. For example, the lithium battery may be a lithium metal battery including lithium metal as the anode.

Figure 7:
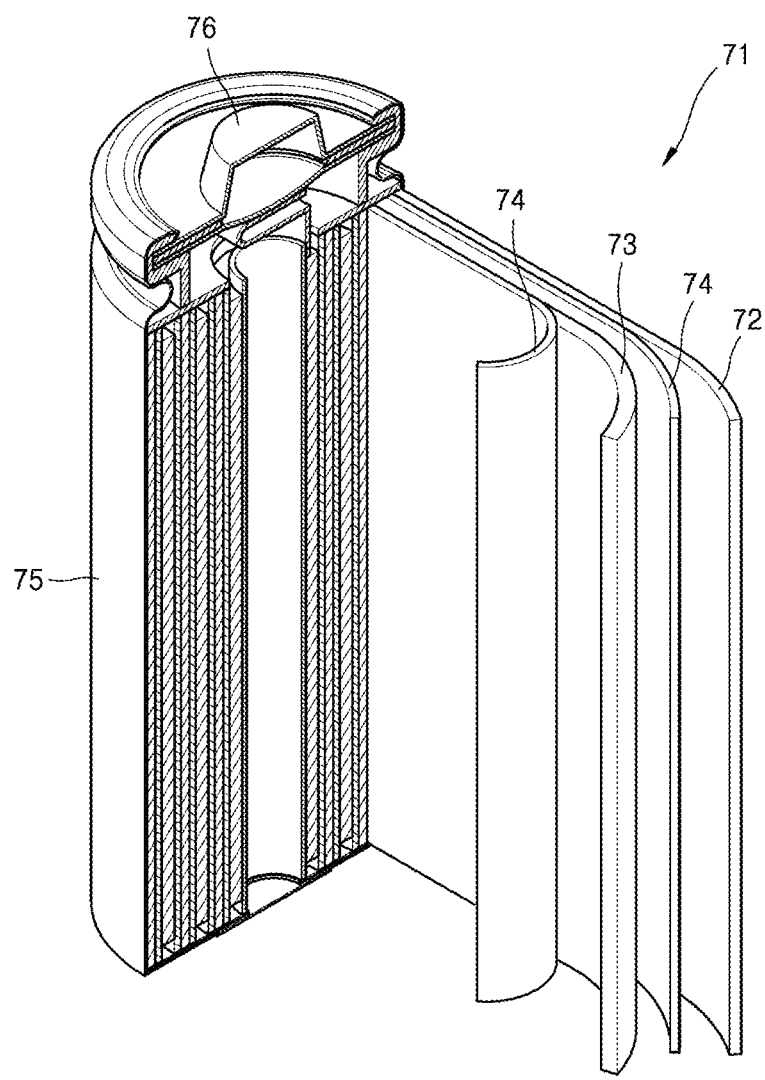
FIG. 7 is a schematic view of a lithium battery according to an embodiment.

Referring to FIG. 7, a lithium ion battery 71 according to an embodiment may include a cathode 73, an anode 72, and a separator 74. The cathode 73, the anode 72, and the separator 74 may be wound or folded, and then accommodated in a battery case 75. Subsequently, an organic electrolyte solution may be injected into the battery case 75, followed by sealing with a cap assembly 76 to thereby completing manufacture of the lithium ion battery 71. The battery case 75 may be cylindrical, as illustrated in FIG. 7, or may be a rectangular type or a thin-film type. For example, the lithium battery 71 may be a thin-film type battery.

In an embodiment, the separator 74 disposed between the cathode 73 and the anode 72 may together form a battery assembly. The battery assembly may be stacked to form a bi-cell structure, followed by impregnation with an organic electrolyte solution. The obtained resultant may be accommodated in a pouch and then sealed, thereby completing the manufacture of a pouch-type lithium ion polymer battery.

In an embodiment, the anode 72 of the lithium ion battery 71 may be protected by disposing the composite membrane (not shown) according to the embodiment on at least one surface of, for example, the lithium metal anode.

When the lithium battery according to an embodiment is a lithium sulfur battery, an anode active material of the anode may be a carbonaceous material which allows reversible intercalation/deintercalation of lithium ions, a material forming a lithium-containing compound by reaction with lithium ions, or a lithium alloy.

The carbonaceous material may be any carbonaceous anode active material suitable for use in a lithium-sulfur secondary battery. Examples of the carbonaceous anode active material may be crystalline carbon, amorphous carbon, or a combination thereof. For example, the material forming a lithium-containing compound by reaction with lithium ions may be tin oxide ($SnO_2$), titanium nitrate, or silicon (Si). However, an embodiment is not limited thereto. For example, the lithium alloy may be an alloy of lithium with a metal selected from the group consisting of Na, K, Rb, Cs, Fr, Be, Mg, Ca, Sr, Ba, Ra, Al, and Sn.

For example, the lithium sulfur battery may use elemental sulfur ($S_8$), an elemental sulfur-containing compound, or a combination thereof as a cathode active material. For example, the elemental sulfur-containing compound may include $Li_2S_n$ (wherein n≥1), $Li_2S_n$ (wherein n≥1) dissolved in catholyte, an organic sulfur compound, and a carbon-sulfur polymer (($C_2S_x)_n$, wherein x=2.5 to 50, and n≥2).

When the lithium battery according to an embodiment is a lithium ion battery, a cathode active material may be, for example, a compound (e.g., a lithiated intercalation compound) which allows the reversible intercalation and deintercalation of lithium. For example, the cathode active material may be at least one of include a lithium cobalt oxide, a lithium nickel cobalt manganese oxide, a lithium nickel cobalt aluminum oxide, a lithium iron phosphorus oxide, and a lithium manganese oxide. However, an embodiment is not limited thereto. Any cathode active material available in the art may be used.

In an embodiment, the cathode active material of the lithium ion battery may be at least one of lithium cobalt oxide ($LiCoO_2$); lithium nickel oxide ($LiNiO_2$); a lithium manganese oxide, such as $Li_{1+x}Mn_{2-x}O_4$ (wherein x may be in a range of 0 to 0.33), $LiMnO_3$, $LiMn_2O_3$, or $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxide ($V_2O_5$); a lithium nickel oxide ($LiNi_{1-x}M_xO_2$, wherein M may be Co, Mn, Al, Cu, Fe, Mg, B, or Ga, and x may be in a range of 0.01 to 0.3); a lithium manganese composite oxide, such as $LiMn_{2-x}M_xO_2$ (wherein M may be Co, Ni, Fe, Cr, Zn, or Ta, and x may be in a range of 0.01 to 0.1) or $Li_2Mn_3MO_8$ (wherein M may be Fe, Co, Ni, Cu, or Zn); a lithium manganese oxide ($LiMn_2O_4$) with lithium partially substituted with an alkali earth metal ion; a disulfide compound; and iron molybdenum oxide ($Fe_2(MoO_4)_3$).

In an embodiment, the anode active material of the lithium ion battery may be a carbonaceous material, silicon, silicon oxide, a silicon-based alloy, a silicon-carbonaceous material composite, tin, a tin-based alloy, a tin-carbon composite, a metal oxide, or a combination thereof. For example, the carbonaceous material may include carbon, graphite, or carbon nanotubes.

For example, the anode active material of the lithium ion battery may be selected from Si, $SiO_x$ (wherein 0<x<2, for example, x may be in a range of 0.5 to 1.5), Sn, $SnO_2$, a silicon-containing metal alloy, and a combination thereof. For example, a metal able to form the silicon-containing metal alloy may be at least one selected from Al, Sn, Ag, Fe, Bi, Mg, Zn, in, Ge, Pb, and Ti.

In an embodiment, the anode active material may include a metal/metalloid alloyable with lithium, an alloy thereof, or an oxide thereof. Examples of the metal/metalloid alloyable with lithium, and an alloy or oxide thereof are Si, Sn, Al, Ge, Pb, Bi, Sb, a Si—Y alloy (wherein Y may be an alkali metal, an alkali earth metal, a Group 13 to Group 16 element, a transition metal, a rare-earth element, or a combination thereof, but is not Si), a Sn—Y alloy (wherein Y may be an alkali metal, an alkali earth metal, a Group 13 to Group 16 element, a transition metal, a rare-earth element, or a combination thereof, but is not Sn), and $MnO_x$ (wherein 0<x<2). For example, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

Non-limiting examples of the oxide of the metal/metalloid alloyable with lithium are a lithium titanium oxide, a vanadium oxide, a lithium vanadium oxide, $SnO_2$, and $SiO_x$ (wherein 0<x<2).

For example, the anode active material may include at least one element selected from a Group 13 element, a Group 14 element, and a Group 15 element of. For example, the anode active material may include at least one element selected from Si, Ge, and Sn.

For example, the anode active material may be a mixture or composite of a carbonaceous material with one selected from silicon, a silicon oxide, and a silicon-containing metal alloy as listed above.

In an embodiment, the anode active material may have a simple particulate form, or may be a nanostructure having a nanosize. For example, the anode active material may have any of a variety of forms, for example, a nanoparticle, a nanowire, a nanorod, a nanotube, or a nanobelt.

In an embodiment, the separator between the cathode and the anode may be a multi-layer separator, such as a two-layered polyethylene/polypropylene separator, a three-layered polyethylene/polypropylene/polyethylene separator, or a three-layered polypropylene/polyethylene/polypropylene separator.

An electrolyte solution used in the lithium ion battery may include an organic solvent and a lithium salt.

For example, the organic solvent may be at least one solvent selected from benzene, fluorobenzene, toluene, dimethylformamide, dimethyl acetate, trifluoro toluene, xylene, cyclohexane, tetrahydrofuran, 2-methyltetrahydrofuran, cyclohexanone, ethanol, isopropyl alcohol, dimethyl carbonate, ethyl methyl carbonate, diethyl carbonate, methyl propyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, and sulfolane.

For example, the lithium salt may be at least one lithium salt selected from lithium hexafluorophosphate ($LiPF_6$), lithium tetrafluoroborate ($LiBF_4$), lithium hexafluoroazenate ($LiAsF_6$), lithium perchlorate ($LiClO_4$), lithium trifluoromethanesulfonate ($LiSO_3CF_3$), lithium bis(trifluoromethylsulfonyl)imide ($LiN(SO_2CF_3)_2$), and lithium bis(perfluoroethylsulfonyl)imide ($LiN(SO_2C_2F_5)_2$).

For example, a concentration of the lithium salt in the electrolyte solution may be about 0.01 molar (M) to about 5 M, or about 0.1 M to about 2.0 M.

In the lithium battery according to an embodiment, such as the lithium sulfur battery or the lithium ion battery as described above, the lithium anode may be protected such that a side reaction between the lithium anode and the electrolyte solution may be suppressed, thus improving lithium ion conductivity, and consequently improving conductivity and lifetime characteristics.

According to another aspect of the present disclosure, there is provided a method of preparing the composite membrane according to an embodiment.

A method of preparing the composite membrane includes providing a first substrate comprising a plurality of openings having a predetermined pattern; disposing an ionic conductive particle precursor in the plurality of openings to provide a substrate comprising the ionic conductive particle precursor in the plurality of openings; thermally treating the substrate comprising the ionic conductive particle precursor in the plurality of openings to form a plurality of ion conductive inorganic particles; transferring the plurality of ion conductive inorganic particles to a second substrate; and forming an organic layer on the array of ion conductive inorganic particles on the second substrate.

According to the membrane illustrated in FIG. 1, for example, ion conductive inorganic particles are ground into a minute particulate form. Accordingly, the ground ion conductive inorganic particles may have random shapes and sizes. In addition, even when the ion conductive inorganic particles are formed into columnar shapes through surface abrasion, there is a problem in that, due to irregular particle intervals, it is difficult to obtain increased particle density.

On the other hand, in a method of preparing the composite membrane according to any of the above-described embodiment, openings (through holes) are formed in a specific (e.g. predetermined) pattern on a substrate, the openings are filled with a precursor of the inorganic particles, and the substrate and precursor of the inorganic particles are then thermally treated, thereby preparing the composite membrane including the inorganic particles packed at a high density, the inorganic particles having a controlled size and shape. The precursor refers to a material at the stage prior to the crystallization and synthesis of the ion conductive inorganic particles (for example, LATP), i.e., before the particles cluster together and form single crystals.

Figure 8:
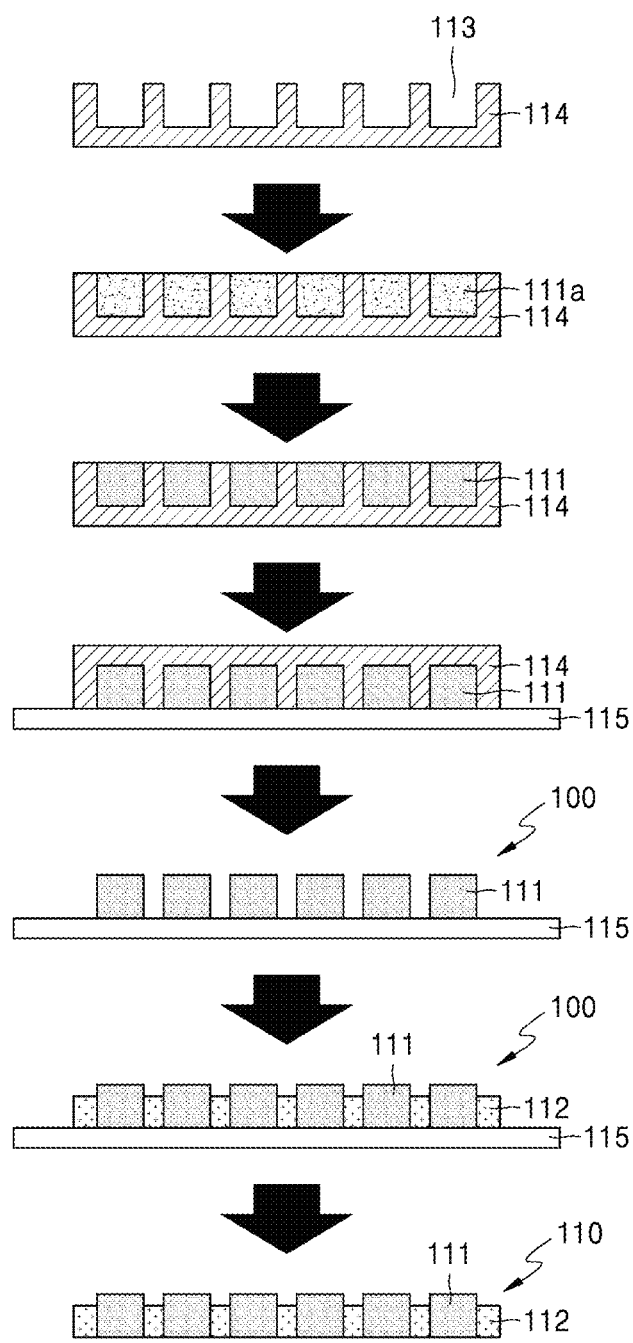
FIG. 8 is a series of schematic views for explaining a method of preparing a composite membrane according to an embodiment.

Referring to FIG. 8, a method of preparing the composite membrane according to an embodiment may include: providing (forming) a first substrate 114 including a plurality of openings 113 in a predetermined pattern; disposing a precursor 111a of ion conducting ionic particles in the openings 113 and filling the openings; thermally treating the substrate 114 including the precursor 111a of ion conductive inorganic particles in the plurality of openings; transferring the ion conductive inorganic particles 111 to a second substrate 115 to thereby form an array 100 in which the ion conductive inorganic particles 111 are regularly arranged; and forming an organic layer 112 on the array 100 of ion conductive inorganic particles on the second substrate 115.

First, the plurality of openings 113 may be formed in the first substrate 114. For example, the first substrate 114 may be a silicon-based material. For example, the first substrate 114 may be a silicon-based oxide having a melting point of about 1100° C. or greater. However, the disclosed embodiment is not limited thereto. For example, the substrate 114 may be $SiO_2$.

Although not illustrated in FIG. 8, the plurality of openings 113 may be formed to include at least one recess, at least one protrusion, or a combination thereof, of which a shape, a number, and a separation interval are appropriately controlled, to thereby form corresponding recesses or protrusions on surfaces of the ion conductive inorganic particles formed through the openings 113.

The openings 113 may be formed using any suitable method, for example, micropatterning.

Then, the plurality of opening 113 may be filled with a dispersion including the precursor 111a of the ion conductive inorganic particles dispersed in a solvent, followed by drying (optional), and uniformly wiping surfaces thereof.

Then, the surfaces of the substrate 114 filled with the precursor 111a may be thermally treated, for example, at a temperature of about 800° C. to about 1500° C. for about 1 hour to about 12 hours, to thereby form the ion conductive inorganic particles 111.

Then, only the formed ion conductive inorganic particles 111 may be transferred, for example, to a second substrate (an adhesive tape) 115, thereby forming the array 100 in which the ion conductive inorganic particles 111 are regularly disposed.

Then, the array 100 may be coated with a polymer to form an organic layer 112 on the array 100.

Then, the adhesive tape 115 may be removed to thereby form a composite membrane 110 including the ion conductive inorganic particles 111 and the organic layer 112.

When the thermal treatment is performed, the thermal treatment conditions may be varied depending on the type of ion conductive inorganic particles which are used. For example, the thermal treatment may be performed at a temperature of about 800° C. to about 1500° C., or about 900° C. to about 1200° C.

An embodiment of the present disclosure will now be described in detail with reference to the following examples. However, these examples are only for illustrative purposes and are not intended to limit the scope of the embodiment of the present disclosure.

PREPARATION OF COMPOSITE MEMBRANE

Example 1

A silicon substrate including a plurality of hexahedral openings disposed at intervals of about 5 µm and each having a dimension of 100 µm (width)×100 µm (length)×36 µm (height) with square upper and lower surfaces was formed, and then surfaces of the silicon substrate were subjected to micropatterning by photolithography to thereby form a plurality of pores (recesses) having dimensions of 1 µm (width)×1 µm (length)×1 µm (depth) at intervals of about 1 µm on each of the four sides of each opening, and then thermally treated at about 1000° C. for about 6 hours.

A dispersion of a precursor (100 mg/mL) of lithium-aluminum-titanium-phosphate (LATP: $Li_{1.4}Al_{0.4}Ti_{1.6}P_3O_{12}$) dissolved in an ethanol solution was dropped into the openings in the silicon substrate with a pipette to fill each of the openings in the substrate with the dispersion, and then dried at room temperature for about 1 hour, followed by wiping off excess LATP precursor particles remaining on the surfaces of the substrate with a brush or tissue.

Figure 10:
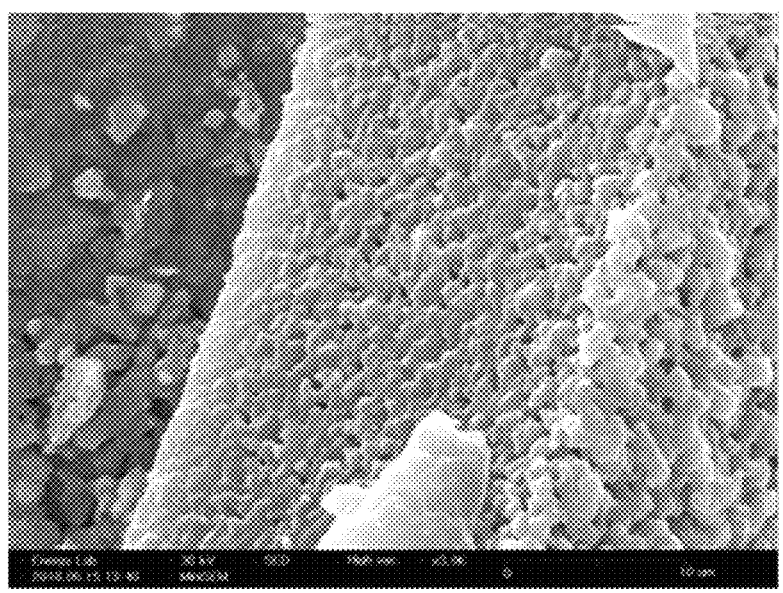
FIG. 10 is a SEM image of a composite membrane prepared in Example 1.

Subsequently, the resulting substrate was sintered at about 1000° C. for about 6 hours, and the LATP particles in the openings of the substrate were transferred onto an adhesive tape having an area of about 5 cm²×5 cm², to thereby form an array of the ion conductive inorganic particles having protrusions. FIG. 10 is a scanning electron microscope (SEM) image of the array.

Separately, 160 mg of pentaerythritol tetrakis(3-mercaptopropionate) (4T) and 240 mg of 1,3,5-triallyl-1,3,5-triazine-2,4,6-trione (TTT) were dissolved in 6.6 milliliters (mL) of a mixed solvent of ethanol and chloroform (1:1 by volume) to obtain a mixture. Then, 30 milligrams (mg) of Irgacure 369 (available from BASF) as a photoinitiator, was added to the mixture and stirred to thereby prepare an organic layer-forming composition. The Irgacure 369 has a structure represented by the following formula:

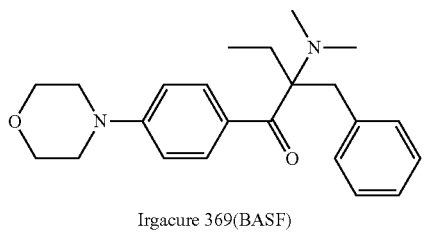 [SMILES: CCC(Cc1ccccc1)(C(=O)c1ccc(N2CCOCC2)cc1)N(C)C]

Irgacure 369(BASF)

The prepared organic layer-forming composition was coated on the array of the ion conductive inorganic particles and irradiated with ultraviolet (UV) light for about 15 minutes to polymerize TTT and 4T, thereby obtaining a composite membrane. The composite membrane had an average thickness of 35 μm.

Comparative Example 1

Figure 9:
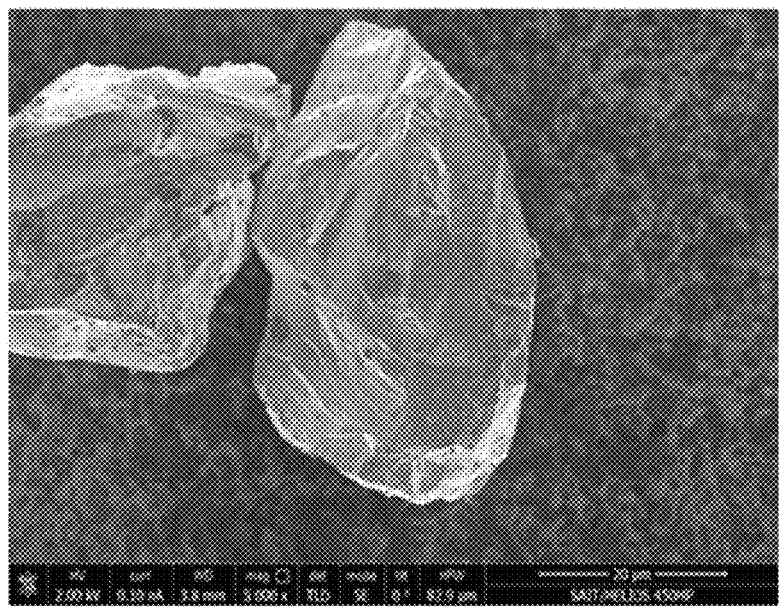
FIG. 9 is a scanning electron microscope (SEM) image of a composite membrane prepared in Comparative Example 1.

A lithium-aluminum-titanium-phosphate (LATP: $Li_{1.4}Ti_{1.6}Al_{0.4}P_3O_{12}$) layer (Ohara glass, available from Ohara corporation) was ground and then sieved with sieves having openings with a diameter of about 63 μm and about 53 μm, respectively, to thereby obtain LATP particles having a size (average particle diameter) of about 58 μm. FIG. 9 is a SEM image of the prepared LATP particles. Referring to FIG. 6, the LATP particles were found to be amorphous.

The LATP particles were distributed over a surface of a double-sided adhesive tape attached to a glass plate, and then shaken such that only the LAPT particles adhering to the tape remained and the rest fell off, thereby forming a monolayer of ion conductive inorganic particles.

The organic layer-forming composition obtained in Comparative Example 1 was coated on the monolayer of ion conductive inorganic particles and irradiated with UV light for about 15 minutes to polymerize TTT and 4T, thereby obtaining a composite membrane. The composite membrane had an average thickness of about 50 μm.

Evaluation Example: Mechanical Strength Evaluation

Tensile strength and yield strain of the composite membranes prepared in Example 1 and Comparative Example 1 were measured using a Universal Test Machine (Intron 5565). The results are shown in FIG. 11.

Figure 11:
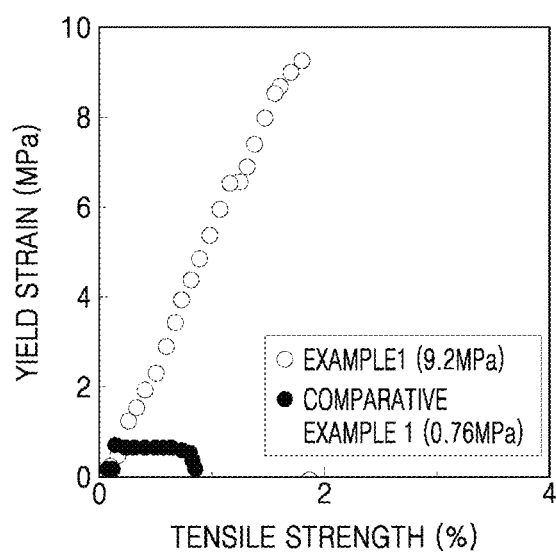
FIG. 11 is a graph of yield strain (megapascals, MPa) versus tensile strength (percent, %), comparing the tensile strength and yield strain measurements of the composite membranes of Example 1 and Comparative Example 1 as measured.

Referring to FIG. 11, the composite membrane of Example 1 was found to have a remarkably increased mechanical strength of 9.2 MPa, as compared with the composite membrane of Comparative Example 1 having a mechanical strength of about 0.76 MPa. The greater the mechanical strength, the larger the size of the composite membrane and a lithium battery including the composite membrane. It may also be possible to form the composite membrane and a lithium battery through atomization processes with automatic production facilities.

As described above, according to the disclosed embodiment, a composite membrane may include ion conductive inorganic particles having a surface including at least one recess and/or at least one, and thus may improve binding strength between the ion conductive inorganic particles and an organic layer which forms the composite membrane. Accordingly, the composite membrane may have improved mechanical strength. A lithium battery including the composite membrane according to the disclosed embodiment may have improved energy density per weight and improved capacity characteristics.

It should be understood that the embodiment described herein should be considered in a descriptive sense only and not for purposes of limitation. Descriptions of features or aspects within the embodiment should be considered as available for other similar features or aspects in other embodiments.

While an embodiment have been described with reference to the figures, it will be understood by those of ordinary skill in the art that various changes in form and details may be made therein without departing from the spirit and scope as defined by the following claims.

What is claimed is:

1. A composite membrane comprising:
   an organic layer comprising a plurality of through holes; and
   a plurality of ion conductive inorganic particles disposed in the plurality of through holes,
   wherein a surface of each ion conductive inorganic particle of the plurality of ion conductive inorganic particles comprises at least one protrusion, and
   wherein the surface comprising the at least one protrusion faces a surface of the organic layer.

2. The composite membrane of claim 1, wherein the composite membrane has a first surface and a second surface, and the plurality of ion conductive inorganic particles are exposed at each of the first surface and the second surface, and wherein the first surface is located at a side of the composite membrane which is opposite to the second surface, and
   the at least one protrusion has a continuous or discontinuous structure extending from the first surface to the second surface.

3. The composite membrane of claim 1, wherein each of the ion conductive inorganic particles has a porous surface structure.

4. The composite membrane of claim 1, wherein the surface of each ion conductive inorganic particle of the plurality of ion conductive inorganic particles further comprises at least one recess, and wherein a length of the at least one recess and a length of the at least one protrusion are each independently about 10 percent to about 50 percent of an average particle diameter of the plurality of ion conductive inorganic particles.

5. The composite membrane of claim 1, wherein each of the plurality of ion conductive inorganic particles comprises a plurality of protrusions and optionally, further comprises a plurality of recesses.

6. The composite membrane of claim 5, wherein each recess of the plurality of recesses and each protrusion of the plurality of protrusions has an identical shape or a different shape.

7. The composite membrane of claim 1, wherein the surface of each ion conductive inorganic particle of the plurality of ion conductive inorganic particles further comprises at least one recess, wherein an occupation area of the at least one recess is about 5 percent to about 30 percent of a total surface area of each ion conductive inorganic particle of the plurality of ion conductive inorganic particles comprising the at least one recess.

8. The composite membrane of claim 1, wherein an occupation area of the at least one protrusion is about 5 percent to about 50 percent of a total surface area of each of the plurality of ion conductive inorganic particles comprising the at least one protrusion.

9. The composite membrane of claim 1, wherein
at least one surface of the composite membrane comprises a sea-island structure in which the plurality of ion conductive inorganic particles are discontinuously disposed in the organic layer, or
a cross-section of the composite membrane comprises a structure in which the plurality of ion conductive inorganic particles are alternately aligned with regions of the organic layer.

10. The composite membrane of claim 1, wherein the plurality of ion conductive inorganic particles embedded in the organic layer are disposed in the form of a monolayer.

11. The composite membrane of claim 1, wherein the organic layer comprises a polymer comprising a homopolymer, a block copolymer, a random copolymer, or a combination thereof.

12. The composite membrane of claim 1, wherein an amount of the plurality of ion conductive inorganic particles is about 10 parts by weight to about 90 parts by weight based on 100 parts by weight of the composite membrane.

13. The composite membrane of claim 1, wherein the plurality of ion conductive inorganic particles have an average particle diameter of about 1 micrometer to about 500 micrometers.

14. The composite membrane of claim 1, wherein the plurality of ion conductive inorganic particles comprises a glassy active metal ion conductor, an amorphous active metal ion conductor, a ceramic active metal ion conductor, a glass-ceramic active metal ion conductor, or a combination thereof.

15. The composite membrane of claim 1, wherein the plurality of ion conductive inorganic particles comprises $Li_{1+x+y}Al_xTi_{2-x}Si_yP_{3-y}O_{12}$ wherein $0<x<2$ and $0 \leq y<3$, $BaTiO_3$, $Pb(Zr_{1-x}Ti_x)O_3$ wherein $0 \leq x \leq 1$, $Pb_{1-x}La_xZr_{1-y}Ti_yO_3$ wherein $0 \leq x<1$ and $0 \leq y<1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0 \leq x \leq 1$, $0 \leq y \leq 1$, $0 \leq a \leq 1$, and $0 \leq b \leq 1$, $Li_xLa_yTiO_3$ wherein $0<x<2$ and $0<y<3$, $Li_xGe_yP_zS_w$ wherein $0<x<4$, $0<y<1$, $0<z<1$, and $0<w<5$, $Li_xN_y$ wherein $0<x<4$ and $0<y<2$, $Li_xSi_yS_z$ wherein $0<x<3$, $0<y<2$, and $0<z<4$, $Li_xP_yS_z$ wherein $0<x<3$, $0<y<3$, and $0<z<7$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a garnet ceramic, $Li_{3+x}La_3M_2O_{12}$ wherein M is Te, Nb, or Zr, and x is an integer from 1 to 10, or a combination thereof.

16. The composite membrane of claim 1, wherein the organic layer comprises a polymer having a water permeability of about 0.001 gram of water per square meter per day to about 1 gram of water per square meter per day and an oxygen permeability of about $10^{-3}$ cm$^3$/m$^2$ day to about 1,000 cm$^3$/m$^2$ day.

17. The composite membrane of claim 1, wherein the organic layer comprises:
a polymerization product of a polyfunctional monomer; or
a polymerization product of a polyfunctional monomer and a polythiol having 3 or 4 thiol groups,
wherein the polyfunctional monomer comprises a polyfunctional acryl monomer, a polyfunctional vinyl monomer, or a combination thereof.

18. The composite membrane of claim 1, wherein an area of the plurality of ion conductive inorganic particles exposed at a surface of the composite membrane is about 30 percent to about 80 percent, based on a total surface area of the composite membrane.

19. A lithium battery comprising:
an anode,
a cathode, and
the composite membrane according to claim 1 between the cathode and the anode.

20. The lithium battery of claim 19, wherein the lithium battery is an all-solid battery or a lithium-air battery.

* * * * *